Feb. 4, 1930.          T. C. LEAKE            1,746,001
              FRAME STRUCTURE FOR TRACTORS
              Filed May 26, 1922      3 Sheets-Sheet 1
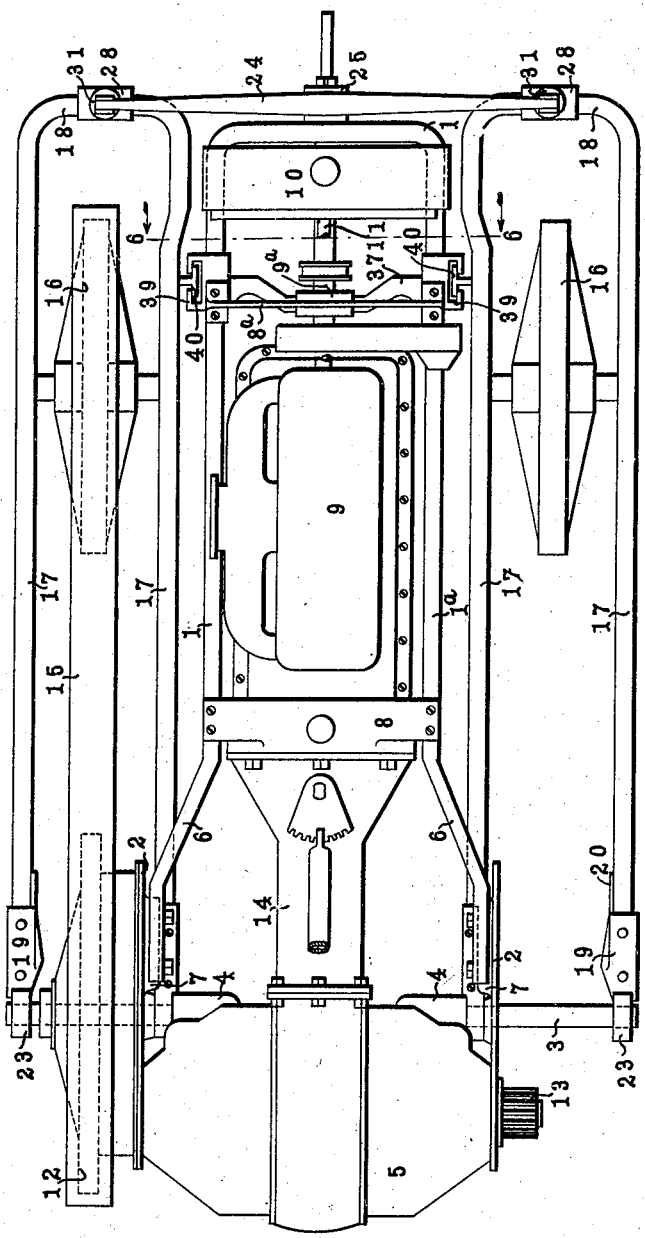
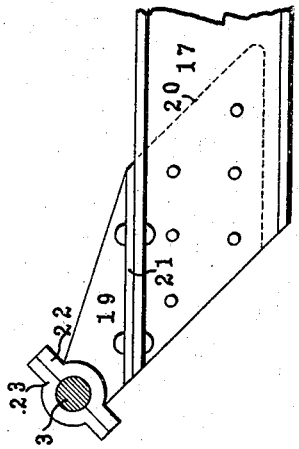
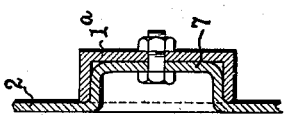
INVENTOR
Thomas C. Leake,
BY
Duell, Warfield & Duell,
ATTORNEY Feb. 4, 1930.  T. C. LEAKE  1,746,001
FRAME STRUCTURE FOR TRACTORS
Filed May 26, 1922  3 Sheets-Sheet 2
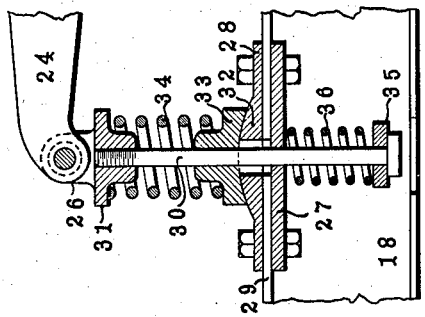
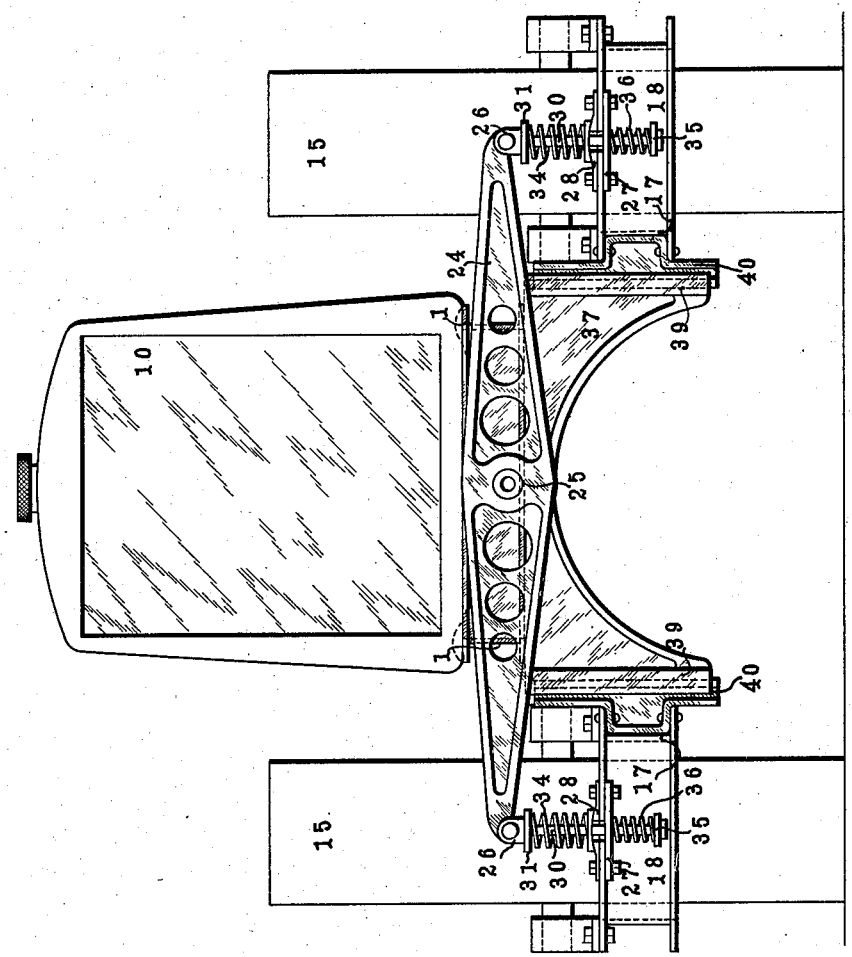
INVENTOR
Thomas C. Leake,
BY
Duell, Warfield & Duell.
ATTORNEY Feb. 4, 1930.  T. C. LEAKE  1,746,001
FRAME STRUCTURE FOR TRACTORS
Filed May 26, 1922   3 Sheets-Sheet 3
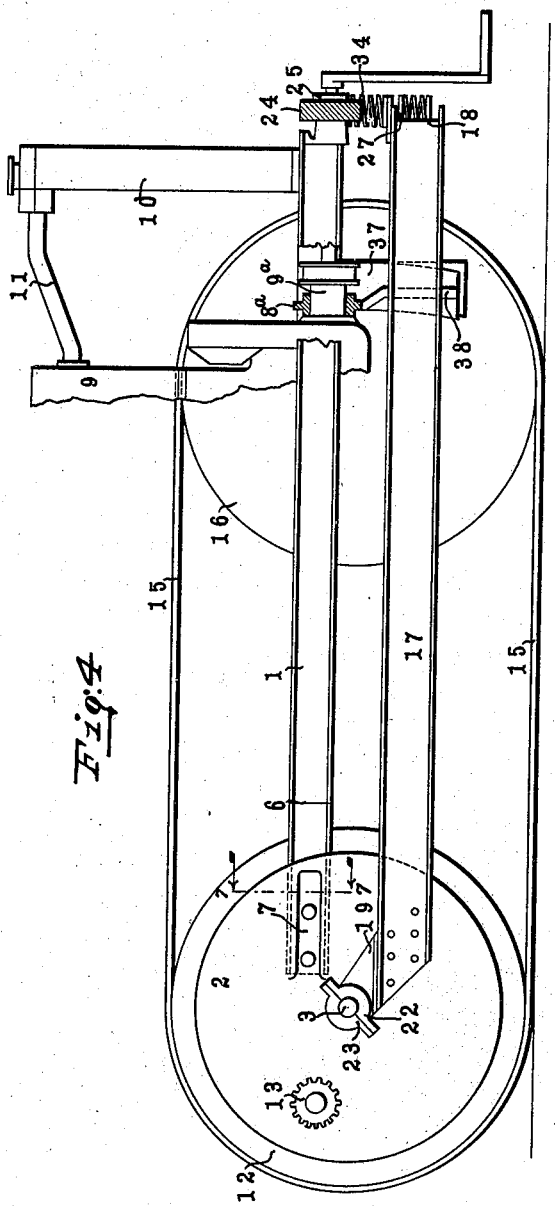
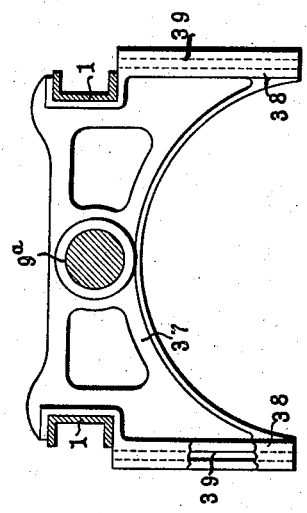
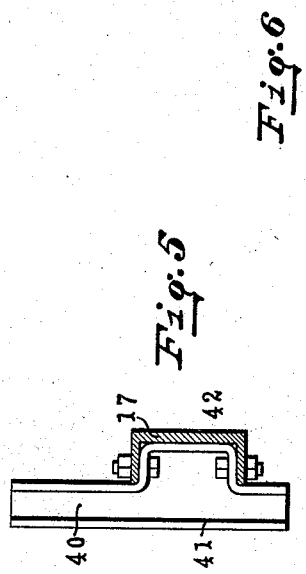
INVENTOR
Thomas C. Leake,
BY
Duell, Warfield & Duell
ATTORNEY Patented Feb. 4, 1930

1,746,001

UNITED STATES PATENT OFFICE

THOMAS C. LEAKE, OF NEW YORK, N. Y., ASSIGNOR, BY MESNE ASSIGNMENTS, TO BEAR TRACTOR CORPORATION OF AMERICA, OF NEW YORK, N. Y., A CORPORATION OF DELAWARE

FRAME STRUCTURE FOR TRACTORS

Application filed May 26, 1922. Serial No. 563,977.

This invention relates to tractors, and more particularly in some of its details to frame structures for tractors of the flexible tread type.

The invention has for its general object an improved construction and arrangement of parts providing a tractor which is flexible, strong and inexpensive in manufacturing costs.

A more specific object is to provide an improved arrangement of the engine-carrying frame with respect to the so-called tractor or track frames of track-laying tractors, whereby the tractor is enabled to travel over comparatively rough ground, and at the same time perform efficiently its traction functions.

Another object is to provide improved equalizing connections whereby the weight of the power unit is at all times properly distributed between the tractor frames and distortion and excessive stresses avoided.

Still another object is to provide improved guiding mechanism for directing the movement of the tractor frames under operating conditions.

Another object is to provide improved articulation for various parts of tractor frames of the track laying type whereby the tractor is enabled to properly perform its functions under severe service conditions.

Other objects and advantages will be in part pointed out in connection with the following detailed description and will be in part obvious from the arrangements and constructions therein set forth.

The invention accordingly consists in the features of construction, combinations of elements and arrangement of parts which will be exemplified in the construction hereinafter set forth, and the scope of their application will appear in the appended claims.

For a complete understanding of the nature and advantages of this invention references should be had to the following detailed description and to the accompanying drawings, wherein an illustrated embodiment of the invention is shown, and in which Figure 1 is a plan view of the invention as applied to a tractor of the flexible tread type, certain parts being removed for clearness of disclosure;

Fig. 2 is a front elevation of the same;

Fig. 3 is an enlarged, detailed sectional view taken centrally through one of the equalizing connections;

Fig. 4 is a fragmentary side elevation of the invention, certain parts being shown in section and broken away;

Fig. 5 is a fragmentary sectional view showing the attachment of one of the side members of the tractor frame;

Fig. 6 is a fragmentary transverse sectional view taken approximately on the line 6—6 of Fig. 1 and showing the guiding casting attached to the power unit frame;

Fig. 7 is a detailed enlarged sectional view taken on the line 7—7 of Fig. 4 and Fig. 8 is a detail of the connection of the rear end of the tractor frame.

Referring now to the drawings for a detailed description of the embodiment shown, a tractor of the flexible tread type is shown having a main power unit supporting frame 1 having supporting connections at its rear end to spaced plates 2 which act as guard plates for protecting certain parts of the structure. These plates are mounted on a transverse axis comprising aligned studs or supports 3 rigidly mounted in integral formations 4 on a gear-housing 5, the plates 2 being rigidly mounted on studs 3 in any desired manner. The rearward edges of the plates or discs 2 are also secured to the gear-housing 5 as shown in Figure 1. The frame 1 preferably includes side frame members made up of a single rolled metallic channel shape bent into substantially U-form and having its rearward extending legs 1ª diverging as at 6 and bolted at the rear ends to integrally offset formations 7 on the plates 2. Transverse members 8 and 8ª are secured to the side members of the frame 1 and the engine 9 is secured at spaced points to these transverse members. There may, of course, be additional transverse supporting and bracing members if desired. The engine unit is rigidly secured to the member 8 which may, if desired, form an integral part of the engine casing, and at its forward end the engine is secured by a centrally disposed lug 9ª to the cross member 8ª. This arrangement provides in effect a three point suspension for the engine, which is an advantageous type of construction. A radiator element 10 is supported on the forward part of the main supporting frame and is connected in any approved manner with the cooling jacket of the engine by conduits, one of which is shown at 11.

Rotatably mounted on each of the aligned studs 3 is a sprocket 12 arranged to be driven in any desired manner from a train of gearing arranged within the gear housing 5 and connected to receive power from the engine. Driving pinions 13 are arranged exteriorly of the gear box to mesh with circular racks or gears carried by the sprockets. The details of this driving connection are not claimed herein and therefore no further detailed description of the same is necessary. The power transmitting mechanism, the steering gear, etc., are enclosed in the housing 14, detachably connected to the gear housing 5 and forming a forward extension of the latter.

Each of the sprockets 12 carries, and is arranged to drive, an endless flexible traction belt or chain 15 passing around the sprocket and also passing around and supported at its forward end by a spaced rotatable idler 16 in a manner known in the art. Since this flexible traction member is not claimed specifically herein, it is, for convenience, shown diagrammatically in the drawings. For flexibly connecting the traction elements of the tractor to the main or power unit frame, a pair of tractor or track frames spaced at opposite sides of the main frame are provided. As shown each of these tractor frames preferably comprises a U-shaped frame 17 of rolled metallic channel shapes bent intermediate its ends to provide a forwardly disposed bow 18 lying abreast the forward end of the main frame and rearwardly extending legs. To the rear terminals of these legs are secured plates or brackets 19 for providing a pivotal connection to the studs 3. Each of these brackets has a body portion 20 adapted to be riveted against the web of the channel and an angularly disposed flange 21 for securing to the upper flange thereof. A split bearing is connected at the upper edge of the terminal plate for engaging the studs 3, and comprises a lower half which may be formed integrally with the connecting plate, and an upper half 23 arranged to be bolted to the lower half. It will be noted that these connections provide a pivotal support for the rear ends of the tractor frames whereby the latter lie in a lower plane than that of the power unit frame 1 providing ample room for relative movement of these frames without interference. This arrangement of frames also forms an arch-like construction, bracing the tractor structure transversely and adds to the rigidity thereof and to its ability to withstand the stresses under severe service conditions to which tractors of this class are subjected. It will be noted that each tractor frame carries its idler 16 and flexible traction chain, and these parts are adapted to swing as a unit, as service conditions may require.

A flexible supporting connection, particularly shown in Figs. 1, 2 and 3, is provided in order to support the forward end of the engine frame upon the tractor frames and to allow equal distribution of loads and stresses and to provide for relative swinging movement of these parts. This connection includes a transversely disposed bar 24 pivotally mounted at a point intermediate its ends as at 25, to the forward end of the main frame 1. Flexible connections 26 are provided at opposite ends of this equalizing bar for flexibly connecting the main frame with the tractor frames. These connections are arranged so as to dispose the forward ends of the tractor frames below the level of the frame 1 for providing transverse rigidity and furnishing ample room for movement of the parts as mentioned above. Each of these flexible connections as shown particularly in Figs. 2 and 3, comprises plates 27 and 28 secured to the flange 29 of the tractor frame and arranged respectively below and above said flange. A portion of the flange 29 may be cut away for passage of a link 30 having a head at the lower extremity and threaded at its upper end into a block 31, which is pivoted to the end of the equalizing bar 24. The upper surface of the plate 28 has a spherical formation 32 co-operating with a block 33, formed with a complementary spherical surface. The blocks 31 and 33 are arranged to provide seats for opposite ends of a compression spring 34 placed therebetween. Link 30 extends downwardly through an opening in the plates 27 and 28 and through the flange 29 and is provided with a washer 35 resting on the linkhead and forming a seat for a second spring 36. This second spring surrounds the link and abuts at its upper end against the plate 27.

Means for guiding and supporting the forward ends of the tractor frames and power unit frame in their relative movement are provided. This means comprises a casting 37 rigidly secured to the side members of the frame 1, as shown in Figs. 2 and 6. This casting has downwardly extending legs 38 provided with exterior channel guides 39. Guide members 40, preferably of cast or pressed metal are bolted to the flanges or otherwise secured in position upon the tractor frames 17. These guiding members have flanges 41 for co-operating with the channel guides 39 for guiding relative movement between the tractor frames and the main frame. Each guiding member 40 has an offset lug 42 adapted to be received between the flanges of the tractor frame and to be bolted therethrough forming a firm support. The flange 41 engaging in the channel guide 39 will prevent lateral spreading of the tractor frames relatively to each other or to the main frame, while permitting relative up and down movement of the same. In operation it will be understood that movement is transmitted to the flexible tractor element 15 from the engine through the power transmission to drive the sprockets 12. When it becomes necessary for the tractor to pass over rough or irregular surfaces, each tractor frame, with parts carried thereby is permitted to move upwardly by means of the pivotal connection at the rear ends thereof. This enables the flexible treads to align themselves in accordance with the irregularities in the ground and to remain always in contact with the traction surfaces in position to perform their traction functions. At the same time twisting and other distorting stresses in the tractor frames themselves or on the main supporting frame are effectually avoided and breakage and wear of the parts are minimized. The flexible connections between the track frames and between the engine frame at the forward ends thereof to the equalizing bar 24 permit this relative movement of the frames and equalize the stresses while the guiding means 37—40, keep the frames at all times in proper lateral alignment. Shocks due to sudden upward or downward relative movement of the frames are absorbed in the cushioning springs 34 or 36, these springs coming into play respectively dependent upon whether the relative movement of the tractor frame is upward or downward. Shocks due to lateral lurching of the main frame are also absorbed by these springs. Angular movements of the links 30 due to slight lateral relative movements between the main and track frames and to different angular positions of the equalizing bar 24 are permitted by the spherical formations of the co-operating plates 28 and 33.

By the arrangement of flexible connections between the main frame and the track frames, it will be noted that the track frames are permitted to move upwardly or downwardly independently of movement of the main engine frame.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent, is:

1. In a tractor, in combination, a pair of track frames pivotally mounted and arranged in parallel spaced relation, a supporting frame juxtaposed to said track frames, an equalizing bar pivotally connected to said supporting frame, and a swinging connection between each end of said equalizing bar and one of said track frames and having a universal resiliently yielding connection with the respective track frame and being adapted to cushion shocks in a plurality of directions between said equalizing bar and said track frames.

2. In a tractor, in combination, track frames movably supported and arranged in parallel spaced relation, a supporting frame adjacent said track frames, an equalizing and supporting bar connected to said supporting frame and a swinging connection between each end of said equalizing bar and one of said track frames, connected to the equalizing bar and to the track frame so as to permit swinging movement of said connection in different directions to compensate for relative movements between said equalizing bar and track frame, said connection including load supply blocks having curved slidably engaging supporting faces.

3. In a tractor, in combination, track frames movably supported and arranged in parallel spaced relation, a supporting frame adjacent said track frames, an equalizing and supporting bar connected to said supporting frame and a swinging connection between each end of said equalizing bar and one of said track frames, each of said connections including a rod flexibly connected to said equalizing bar, load supporting blocks having curved slidably engaging supporting faces, and springs for cushioning stresses between said track frames and equalizing bar in a plurality of directions.

4. In a tractor, in combination, track frames movably supported for independent movement and arranged in parallel spaced relation, a supporting frame adjacent said track frames, an equalizing supporting bar swingably connected to said supporting frame, and a universal supporting connection between each end of the equalizing bar and one of said track frames, said universal connection including a load supporting compression spring between said equalizing bar and the respective track frame, and a connecting rod swingably connected at one end to said equalizing bar and flexibly connected at its opposite end to said track frame.

5. In a tractor, in combination, track frames movably supported and arranged in parallel spaced relation, a supporting frame adjacent said track frames, an equalizing supporting bar swingably connected to said supporting frame, and a universal supporting connection between each end of the equalizing bar and one of said track frames, said universal connection including load supporting blocks having complementary slidably engaging curved surfaces, one block being secured to the track frame, a load supporting compression spring between the equalizing bar and the other supporting block, and a connecting rod swingably connected to the equalizing bar, extending through said supporting blocks and flexibly connected to the track frame.

6. In a tractor, in combination, track frames independently pivotally supported and arranged in parallel spaced relation, a supporting frame adjacent said track frames, an equalizing and supporting bar connected to said supporting frame, and a swinging connection between each end of said equalizer bar and one of said track frames, each of said swinging connections including a resilient compression member interposed between the end of the equalizing bar and the track frame and bearing upon the latter for yieldingly supporting the supporting frame upon the track frame, and a dependent link pivotally connected at its upper end to the end of the equalizing bar and yieldingly connected at its lower end to the track frame.

7. In a tractor, in combination, track frames independently pivotally supported and arranged in parallel spaced relation, a supporting frame adjacent said track frames, an equalizing and supporting bar connected to said supporting frame, and a swinging connection between each end of said equalizer bar and one of said track frames, each of said swinging connections including a resilient compression member interposed between the end of the equalizing bar and the track frame and bearing upon the latter for yieldingly supporting the supporting frame upon the track frame, a depending link pivotally connected at its upper end to the end of the equalizing bar, and a resilient member connecting the lower end of said link with the track frame and positioned to bear against the track frame in opposition to said resilient compression member.

8. In a tractor, in combination, track frames independently pivotally supported in spaced relation, a supporting frame adjacent said track frames, an equalizing and supporting bar pivotally connected to said supporting frame, and a swinging connection between each end of said equalizing bar and one of said track frames, each of said swinging connections including a spring bearing block pivoted to the end of said equalizing bar for movement about a horizontal axis, a resilient compression member interposed between said bearing block and track frame, and a depending link connected at one end to said bearing block and extending downwardly therefrom and having a resilient connection at its lower end to the track frame arranged in opposition to said resilient compression member.

In testimony whereof I affix my signature.

THOMAS C. LEAKE.